US010084919B2

(12) United States Patent
Dervan et al.

(10) Patent No.: US 10,084,919 B2
(45) Date of Patent: Sep. 25, 2018

(54) SYSTEM AND METHOD FOR AGENT DRIVEN SYSTEM TRAINING

(71) Applicant: Avaya Inc., Basking Ridge, NJ (US)

(72) Inventors: Siobhan Dervan, Galway (IE); Sean Coyne, Galway (IE); Thomas Eustace, Carran (IE); James Bourke, Mayo (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 15/239,895

(22) Filed: Aug. 18, 2016

(65) Prior Publication Data

US 2017/0054851 A1 Feb. 23, 2017

Related U.S. Application Data

(60) Provisional application No. 62/207,498, filed on Aug. 20, 2015.

(51) Int. Cl.
H04M 3/00 (2006.01)
H04M 3/523 (2006.01)
H04M 5/00 (2006.01)
H04L 12/66 (2006.01)

(52) U.S. Cl.
CPC ....... H04M 3/5235 (2013.01); H04M 3/5233 (2013.01); H04M 3/5238 (2013.01); H04M 2203/408 (2013.01)

(58) Field of Classification Search
CPC ......... G06Q 30/016; G06Q 10/063112; G06Q 10/0631; G06Q 10/06398; H04M 3/5175; H04M 3/5183; H04M 3/5233; H04M 3/5232; H04M 3/523; H04M 3/5166; H04M 3/5191; H04M 3/51; H04M 2203/402; H04M 2203/408; H04M 3/5235; H04M 2201/42; H04M 3/2218; H04M 3/493; H04M 3/5141; H04M 2203/555; H04L 41/0823; H04L 45/44; H04L 63/104; H04L 67/10; H04L 67/306; H04L 51/36; H04L 65/1073; H04L 41/5061
USPC ............ 379/265.09, 265.12, 265.11, 265.03, 379/265.06, 265.02, 265.13, 265.05, (Continued)

(56) References Cited

U.S. PATENT DOCUMENTS

2004/0141508 A1* 7/2004 Schoeneberger ... H04L 41/5064
370/401
2007/0274495 A1* 11/2007 Youd .................... H04M 3/5231
379/210.01

(Continued)

Primary Examiner — Ahmad F Matar
Assistant Examiner — Kharye Pope
(74) Attorney, Agent, or Firm — Stevens & Showalter, LLP

(57) ABSTRACT

A method of routing contacts in a contact center includes receiving a registration from an agent of the contact center, wherein the registration identifies at least one attribute of a future contact the agent has an interest in receiving, receiving an incoming contact to the contact center; and identifying a context of the incoming contact comprising a plurality of contact attributes. Thus, it can be determined that the at least one attribute of the future contact matches at least one of the plurality of contact attributes; and whether the agent of the contact center is available to receive the incoming contact. When the agent of the contact center is available the incoming contact is routed to a first agent device associated with the agent of the contact center.

16 Claims, 6 Drawing Sheets

(58) Field of Classification Search
USPC .......... 379/265.07, 265.1, 266.08; 705/304, 705/7.14, 26.62, 7.42
See application file for complete search history.

(56) References Cited

U.S. PATENT DOCUMENTS

| | | | |
|---|---|---|---|
| 2008/0095355 A1* | 4/2008 | Mahalaha ........... | H04M 3/5233 379/265.09 |
| 2013/0173687 A1* | 7/2013 | Tuchman ........... | G06Q 30/0601 709/202 |
| 2014/0140498 A1* | 5/2014 | Mezhibovsky ..... | H04M 3/5232 379/265.13 |
| 2015/0117632 A1* | 4/2015 | Konig ................. | H04M 3/5233 379/265.12 |
| 2015/0127400 A1* | 5/2015 | Chan .............. | G06Q 10/063112 705/7.14 |
| 2015/0256677 A1* | 9/2015 | Konig ................. | H04M 3/5191 379/265.09 |
| 2015/0271331 A1* | 9/2015 | Segre ................. | H04M 3/5232 379/265.09 |

* cited by examiner

SYSTEM AND METHOD FOR AGENT DRIVEN SYSTEM TRAINING

CROSS REFERENCE TO RELATED APPLICATIONS

This application claims the benefit of U.S. Provisional Patent Application Ser. No. 62/207,498, filed on Aug. 20, 2015, entitled SYSTEM AND METHOD FOR AGENT DRIVEN SYSTEM TRAINING, the entire contents of which are hereby incorporated by reference.

BACKGROUND

Embodiments of the present disclosure generally relate to contact centers, and, in particular, to a system and method to preserve expertise developed by an agent from one contact, and apply the expertise to another contact.

Knowing and predicting customer requirements is vital for every business. However, this knowledge often is derived from generalizations about a whole data set without taking into account specific case details. In the context of contact centers, a caller to a contact center usually may be serviced by one of a large number of qualified agents, based upon coarse information about why the caller is calling, e.g., new sale, account inquiry, product return, etc. However, there may exist one or a small number of preferred agents to handle the customer call. The preference may be based upon, e.g., the agent's subject matter expertise, or recent contact by this customer with the agent, and so forth.

BRIEF SUMMARY

One aspect of the present disclosure relates to a method of routing contacts in a contact center that includes receiving a registration from an agent of the contact center, wherein the registration identifies at least one attribute of a future contact the agent has an interest in receiving, receiving an incoming contact to the contact center; and identifying a context of the incoming contact comprising a plurality of contact attributes. Thus, it can be determined that the at least one attribute of the future contact matches at least one of the plurality of contact attributes; and whether the agent of the contact center is available to receive the incoming contact. When the agent of the contact center is available the incoming contact is routed to a first agent device associated with the agent of the contact center. When the agent of the contact center is unavailable, the incoming contact is routed to a second agent device associated with an alternative agent of the contact center.

The method also includes receiving information related to resolving the incoming contact; and forwarding the received information to the second agent device. For example, the method can include retrieving information related to resolving the incoming contact; and forwarding, by the server of the contact center, the retrieved information to the second agent device. This information can include information explicitly added by the agent of the contact center that is related to resolving contacts similar in subject matter or other characteristics to the incoming contact. The information can also include automatically collected data by the various systems of the contact center that is associated with the handling of previous contacts that are similar to the incoming contact.

The at least one attribute can comprise an identity of a user associated with the incoming contact and/or the at least one attribute can comprise a demographic attribute of a user associated with the incoming contact; and/or the at least one attribute comprises a subject matter of the incoming contact.

The method can also include, when the agent of the contact center is unavailable, predicting, a waiting time until the agent of the contact center will be available and a) when the predicted wait time is more than a predetermined time tolerance, routing the incoming contact to a second agent device associated with an alternative agent of the contact center, or b) when the predicted wait time is less than or equal to the predetermined time tolerance, routing the incoming contact to a queue associated with the agent of the contact center. The predetermined time tolerance can vary, for example, based on a commercial importance of a user associated with the incoming contact or can vary based on an extent of expertise the agent of the contact center has related to a subject matter of the incoming contact, wherein the more expertise an agent has on a subject, the longer it is acceptable to wait for that agent to become available.

Another aspect of the present disclosure relates to a system for routing contacts in a contact center that includes a memory device storing executable instructions, and a processor in communication with the memory device. In particular, the processor, when executing the executable instructions: a) receives a registration from an agent of the contact center, wherein the registration identifies at least one attribute of a future contact the agent has an interest in receiving; b) receives an incoming contact to the contact center; c) identifies a context of the incoming contact comprising a plurality of contact attributes; d) determines that the at least one attribute of the future contact matches at least one of the plurality of contact attributes; e) determines whether the agent of the contact center is available to receive the incoming contact; and f) when the agent of the contact center is available, routes the incoming contact to a first agent device associated with the agent of the contact center.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

Figure 1:
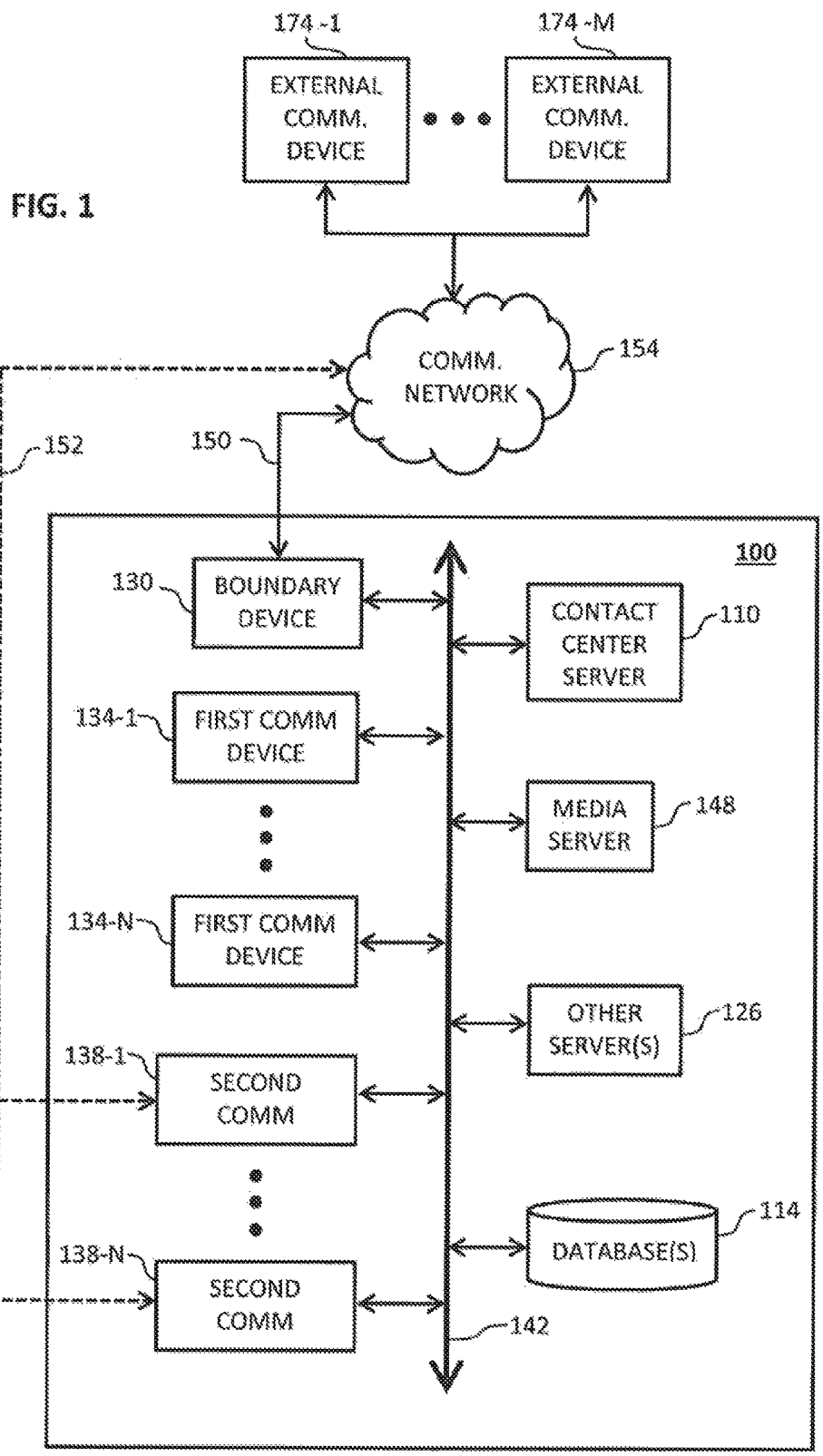
FIG. 1 illustrates a communications system architecture in accordance with the principles of the present disclosure.

The present disclosure will be illustrated below in conjunction with an exemplary communications system. Although well suited for use with, e.g., a system having an Automated Call or Contact Distribution (ACD) system or other similar contact processing switch, the present disclosure is not limited to any particular type of communications system switch or configuration of system elements. Those skilled in the art will recognize that the disclosed techniques may be used in any communications application in which it is desirable to provide improved contact processing.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for illustrative purposes only and should not be construed as limiting of the scope of embodiments of the present disclosure.

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein in connection with embodiments of the present disclosure, the term "contact" refers to a communications from a user or customer. The communications may be by way of any communications medium such as, but not limited to, a telephone call, e-mail, instant message, web chat, and the like. The terms "user" and "customer" denote a party external to the contact center and are used herein to refer to the other party to a contact or a communications session. A user or customer may include, for example, a person requesting assistance for himself or herself or a person requesting assistance for a third party and may also include, for example, a person having a commercial relationship with the contact center or with a business represented by the contact center.

For each "contact" received by the contact center, a computer of the contact center will instantiate a "contact object," which may comprise one or more variables, functions, and data structures that represent the contact. Each contact object comprises a number of attributes, which are assigned values based on its corresponding contact. Each contact object can also include pointers, links or references to other data and/or attributes associated with its corresponding contact. The contact object may be passed amongst the different queues, databases, systems, software applications and other computer-based resources of the contact center. Each contact object may also include a forward reference to another contact object and a backward reference to yet another contact object. In this manner, a prioritized list, or queue, of contact objects may be constructed.

The terms "determine," "calculate," and "compute," and variations thereof, as used herein, are used interchangeably and include any type of methodology, process, mathematical operation or technique.

As used herein, the term "gateway" may generally comprise any device that sends and receives data between devices. For example, a gateway may comprise routers, switches, bridges, firewalls, other network elements, and the like, and any combination thereof.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure may be separately claimed.

As used herein, the term "signal" may include one or more of an electrical signal, a radio signal, an optical signal, an acoustic signal, and so forth.

The terms "switch," "server," "contact center server," or "contact center computer server" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like.

Automatic Call or Contact Distribution (ACD) is a communications server software feature that processes incoming, outgoing, and internal calls and distributes them to groups of extensions called hunt groups or splits. The communications server also sends information about the operation of the ACD to a Call Management System (CMS) which stores and formats the data and produces real-time and historical reports on ACD activity. ACD is used by a contact center to route incoming calls to specifically assigned splits/skills and agents. ACD allows a system administrator to create an efficient call management environment.

One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions. Examples of the types of communications sessions that may be established using SIP include voice, video, and/or instant messaging. SIP also facilitates peer-to-peer communications sessions. These communications sessions may be carried out on any type of communications device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communications devices associated with the user. Using this AOR, a caller can reach any one of the user's communications devices, also referred to as User Agents (UAs) without having to know each of the unique device addresses or phone numbers.

Users or any other addressable entities in a SIP framework are identified by Universal Resource Identifiers (URI). Each such Internet-style address (for example, sip:johndoe@avaya.com) maps into one or more Contacts, each of which typically represents a device or service at which the corresponding user may be reached. Examples include phones, desktop multimedia clients, instant message accounts, email accounts and so on. The SIP framework is responsible for routing a request for a peer-to-peer session addressed to a given URL to one or more appropriate contacts for that URL. The SIP framework may utilize information about the preferences, presence, and location of the user identified by the URL to determine the most appropriate contacts. The protocol also provides mechanisms to specify the type of session that is requested, as well as means to change session parameters.

SIP is not a vertically integrated communications system. Rather, SIP is a component that may be used with other IETF protocols to build a complete multimedia architecture. Typically, these architectures will include protocols such as Real-Time Transport Protocol (RTP) (RFC 3550) for transporting real-time data and providing Quality of Service (QoS) feedback, the Real-Time Streaming Protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 4566) for describing multimedia sessions. Therefore, SIP may be used in conjunction with other protocols in order to provide complete services to the users. However, the basic functionality and operation of SIP does not depend on any of these protocols.

The Real-Time Transport Control Protocol (RTCP) is a protocol that is known and described in IETC RFC 3550. RTCP provides out-of-band statistics and control information for an RTP media stream. It is associated with RTP in the delivery and packaging of a media stream but does not transport the media stream itself. Typically, the RTP media stream will be sent on an even-numbered user datagram protocol (UDP) port, with RTCP messages being sent over the next higher odd-numbered port. RTCP may be used to provide feedback on the QoS in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control QoS parameters, for instance by limiting a flow rate or by using a different codec.

FIG. 1 shows an illustrative embodiment of a communications system comprising a contact center 100 according to the present disclosure. The contact center 100 is in communications with one or more external communications devices 174-1 to 174-M via a communications link 150 and a communications network 154, where M is an integer, M≥1. The external communications devices 174-1 to 174-M are associated with one or more contacts or customers and may comprise, for example, cellular phones, laptops, Personal Computers (PCs), Personal Digital Assistants (PDAs), digital phones, analog phones, and the like. The external communications devices 174-1 to 174-M may be configured to support one or more types of streaming media such as an audio media stream and/or a video media stream. The communications network 154 may be packet-switched and/or circuit-switched and may comprise, for example, a Wide Area Network (WAN) such as the Internet, a PSTN, a Plain Old Telephone Service (POTS) network, a cellular communications network, or combinations thereof. A packet-switched network may comprise any data and/or distributed processing network and typically includes proxies (not shown), registrars (not shown), and routers (not shown) for managing packet flows. A circuit-switched network may comprise a plurality of trunks (not separately labeled).

Figure 2:
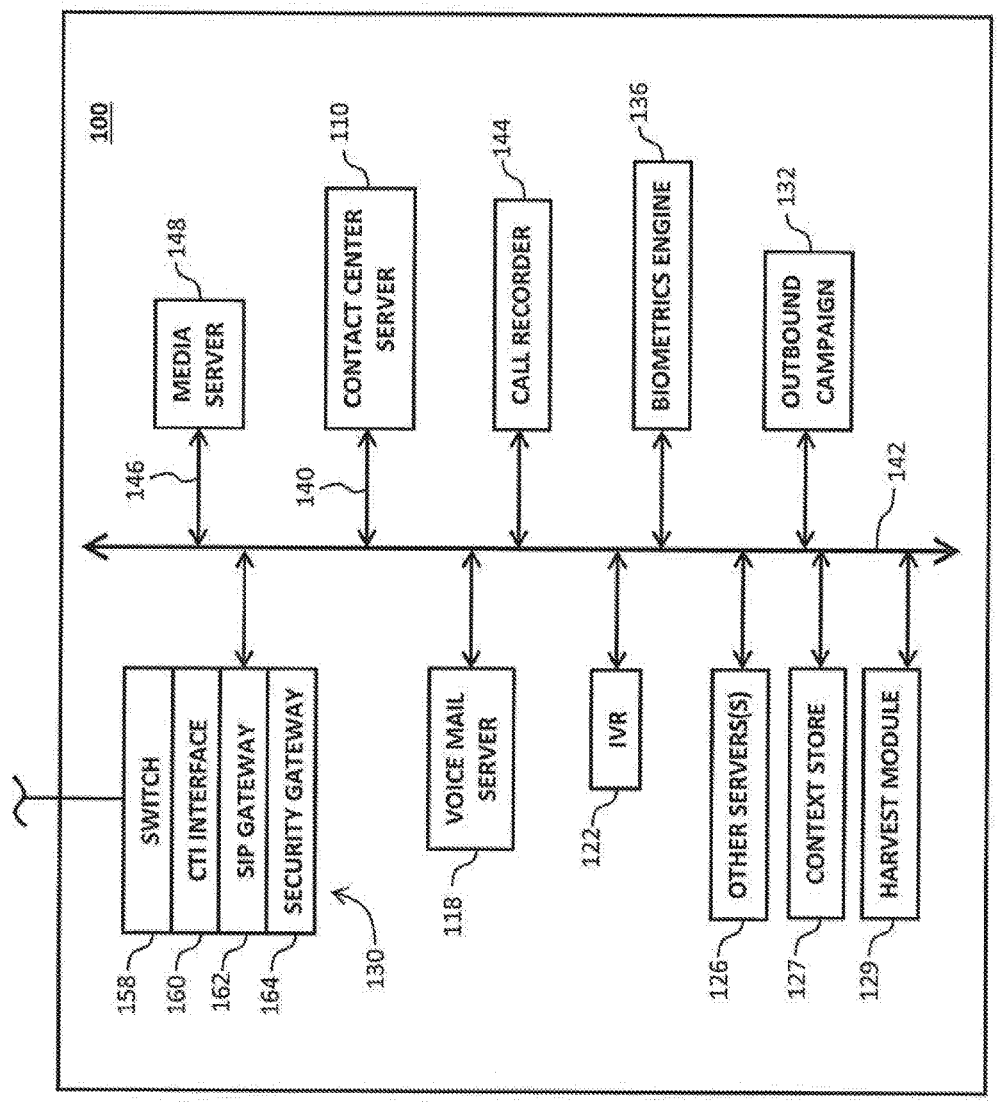
FIG. 2 illustrates aspects of a contact center in accordance with principles of the present disclosure.

As explained in more detail with respect to FIG. 2, the contact center 100 comprises a boundary device 130, a central contact center server 110, a media server 148, one or more other servers 126, and a set of data stores or databases 114 (see FIG. 1) within the contact center 100 containing contact- or customer-related information and other information that may enhance the value and efficiency of the contact processing. Some or all of the components of the contact center 100 may be interconnected by a network 142 such as a local area network (LAN) or WAN. Although one central contact center server 110 is depicted in FIG. 1, two or more servers 110 may be provided in a single contact center 100 or across multiple separate LANs 142 owned and operated by a single enterprise, but separated by the communications network 154. Likewise, two or more media servers 148 may be provided in the contact center 100. In configurations where the contact center 100 includes two or more servers 110 and/or media servers 148, each server 110, 148 may comprise similar functionality, but may be provisioned for providing its features to only a subset of all contact center users. In addition, it should be understood that some or all of the functions depicted in FIGS. 1-3 may be co-hosted and/or co-resident on a single server and/or processor.

The contact center 100 further comprises a plurality of working agents operating packet-switched (first) communications devices 134-1 to 134-N (such as computer workstations or personal computers) and/or circuit-switched (second) communications devices 138-1 to 138-N, where N is an integer, N≥1. The first agent communications devices 134-1 to 134-N may include, for example, IP hardphones such as the 4600 Series IP Phones™ by Avaya Inc., IP softphones such as the IP Softphone™ by Avaya Inc., Personal Digital Assistants (PDAs), Personal Computers (PCs), laptops, packet-based H.320 video phones and conferencing units, packet-based voice messaging and response units, packet-based traditional computer telephony adjuncts, peer-to-peer based communications devices, and any other suitable communications device. In one configuration, the server 110, the network 154, and the first agent communications devices 134-1 to 134-N are SIP compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk. The second agent communications devices 138-1 to 138-N may each correspond to one of a set of internal extensions Ext1 to ExtN, respectively, and may include, for example, wired and wireless telephones, PDAs, H.320 videophones and conferencing units, voice messaging and response units, traditional computer telephony adjuncts, and any other suitable communications device. The second agent communications devices 138-1 to 138-N may be in communications with the external communications devices 174-1 to 174-M via one or more link(s) 152. The link(s) 152 is depicted with a dashed line to indicate that it represents a logical representation of the connections between the external communications devices 174-1 to 174-M and the second communications devices 138-1 to 138-N. The actual, physical connection between these devices can include various routing through the network 142, possibly the boundary device 130, and one or more of the servers 110, 148, 126.

It should be noted that the present disclosure does not require any particular type of information transport medium between the components of the contact center 100, i.e., the present disclosure may be implemented with any desired type of transport medium as well as combinations of different types of transport channels. It should also be emphasized that the configuration of the elements of the contact center 100 as shown in FIG. 1 is for purposes of illustration only and should not be construed as limiting the disclosure to any particular arrangement of elements.

FIG. 2 illustrates aspects of a contact center 100 in accordance with principles of the present disclosure comprising a boundary device 130, a contact center server 110, a media server 148, a call recorder 144, a biometrics engine 136, and an outbound campaign 132. The contact center 100 may also comprise a plurality of additional servers, namely a voice mail server 118, an Interactive Response unit (e.g., IVR) 122, and one or more other servers 126. Although depicted as separate servers and/or applications, it should be appreciated that some or all of the functions depicted in FIG. 2 may be co-hosted and/or co-resident on a single server and/or processor, e.g. the contact center server 110.

The contact center server 110 and the media server 148 may each be connected to the LAN 142 via its own respective communications link 140, 146, as shown, or via the switch 158 (not shown). The contact center server 110 may also be connected via one or more optional communications links (not shown) to one or more other components of the contact center 100, including for example, the media server 148, the call recorder 144, the biometrics engine 136, and the outbound campaign 132. As will be appreciated, the one or more other servers 126 may also include a scanner (which is normally not connected to the switch 130), VoIP software, video call software, voice messaging software, an IP voice server, a fax server, a web server, an e-mail server, and the like.

The boundary device 130 may include the functionality of one or more of a switch 158, a computer-telephony integration (CTI) interface 160, a SIP gateway 162, or a security gateway 164. The switch 158 and/or server 110 may comprise any architecture for directing contacts to the one or more agent communications devices 134, 138 (see FIG. 1). In some embodiments, the switch 158 may perform load-balancing functions by allocating incoming or outgoing contacts among a plurality of logically and/or geographically distinct contact centers 100. Illustratively, the switch 158 and/or server 110 may be a modified form of the subscriber-premises equipment sold by Avaya Inc. under the names Definity™ PBX-based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 158 and/or server 110 is a stored-program-controlled system that conventionally includes interfaces to external communications links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

As shown in FIGS. 1 and 2, the CTI interface 160 and SIP gateway 162 may facilitate communications between the external communications devices 174-1 to 174-M and the first and second agent communications devices 134, 138. The SIP gateway 162, for example, can connect with one or more SIP trunks from the communications network 154 and split incoming aggregate SIP traffic into individual SIP sessions and aggregate the individual outbound SIP sessions. The security gateway 164 may be positioned between the server 110 and the communications network 154 to process information passing between the server 110 and the communications network 154. The security gateway 164 may be, for example, Avaya Inc.'s, G700 Media Gateway™ and may be implemented as hardware such as via an adjunct processor (as shown) or as a chip in the server 110.

The servers and/or computers of the contact center 100 can also include a context store 127 and a harvest module 129. These two features are shown as separate systems in FIG. 2 but they can also execute on a single server or a single cluster of servers, which can be referred to as an experience manager. The harvest module 129 is configured to build or add data (or relevant information for customers) to the context store 127. The context store 127 includes a database or repository that stores various transit data, for example, data related to customer interaction. An additional database may be utilized by the harvest module 129 to process data, and to store other data. A contact or customer may communicate with disparate systems within the contact center 100 and these systems can retrieve data from the context store 127 or provide data to be stored in the context store 127.

In one embodiment, the harvest module 129 may communicate with a ticketing system, an order tool system, a sentiment analysis engine, a customer relationship management (CRM) system, and a business process management system (BPM) to build or add data to the context store 127. The harvest module 129 may communicate with these systems and provide updated data to the context store 127 according to various contacts that are being handled and monitored within the contact center 100.

In an example, following a customer interaction with an agent of the contact center 100, the harvest module 129 may update the context store 127. In another embodiment, the ticketing system, the order tool system, the sentiment analysis data, the customer relationship management (CRM) system, and the business process management system (BPM) may directly push information, as well as, extract it out of the context store 127.

As an example, the sentiment analysis data may include sentiment of a contact, for example, happy, angry, complain, etc. during an interaction of the contact with a contact center agent.

The CRM updates may include data about any update in customer or contact relation with the enterprise or the contact center. The order update information may include update about the total order placed by the contact. The call/interaction metrics may include call duration, number of participants, was call transferred, was supervisor involved, etc. Further, any component or system of the contact center 100, for example, a self-service system, can access the context store 127, retrieve the context information, update it, change it, put it back in again, and so on and so forth.

The harvest module 129 may harvest relevant data from disparate sources related to customers. For example, the harvest module 129 may harvest relevant data related to the customers from the context store 127. In one embodiment, the harvest module 129 harvests the sentiment analysis data, the CRM updates, the order update information, Post call/interaction survey, Call/interaction metrics, and any interaction context data, as described above. The harvest module 129 gathers this data and other information that has changed during, and in the aftermath of, the customer interaction.

The context store 127 may further store any information, for example, information related to interaction, information related to context of interaction, current information, or case information, and updated information. For example, once an agent finishes a call, the harvest module 129 can start processing and storing the information in the context store 127.

The context store 127 provides a centralized data cache to the various applications in the contact center 100. The context store 127 can provide a RESTful Web Service API so that other applications can set or get context information. While various database schemes may be contemplated, the context information stored about a contact is stored so that the information can be searched and retrieved based on any of a variety of data stored therein. For example, each entry in the context store can include a) a ContextID which is a text field that contains a unique identifier for the context entry; b) the data, which can include multiple key-value pairs; and c) a GroupID which allows logical groups of related context entries to be created.

As described herein, various data, or context, about a contact can be generated, retrieved and stored. This contextual information can include present attributes about the contact, a device associated with the contact, a location of a user associated with the contact, an identity of the user associated with the contact; devices and/or locations associated with past contacts involving the associated user or user device, social media information about the user associated with the contact, and past purchases, past inquiries, group affiliation and demographic information about the user associated with the contact. The contextual information can also include various information about contact center resources, agents, and problem resolution associated with past interactions with the user associated with a contact.

Although some embodiments are discussed with reference to a client-server architecture, it is to be understood that the principles of the present disclosure apply to other network architectures. For example, the present disclosure applies to peer-to-peer networks, such as those envisioned by SIP. In the client-server model or paradigm, network services and the programs used by end users to access the services are described. The client side provides a user with an interface for requesting services from the network, and the server side is responsible for accepting user requests for services and providing the services transparent to the user. By contrast, in the peer-to-peer model or paradigm, each networked host runs both the client and server parts of an application program. Additionally, the disclosure does not require the presence of packet- or circuit-switched networks.

Figure 3:
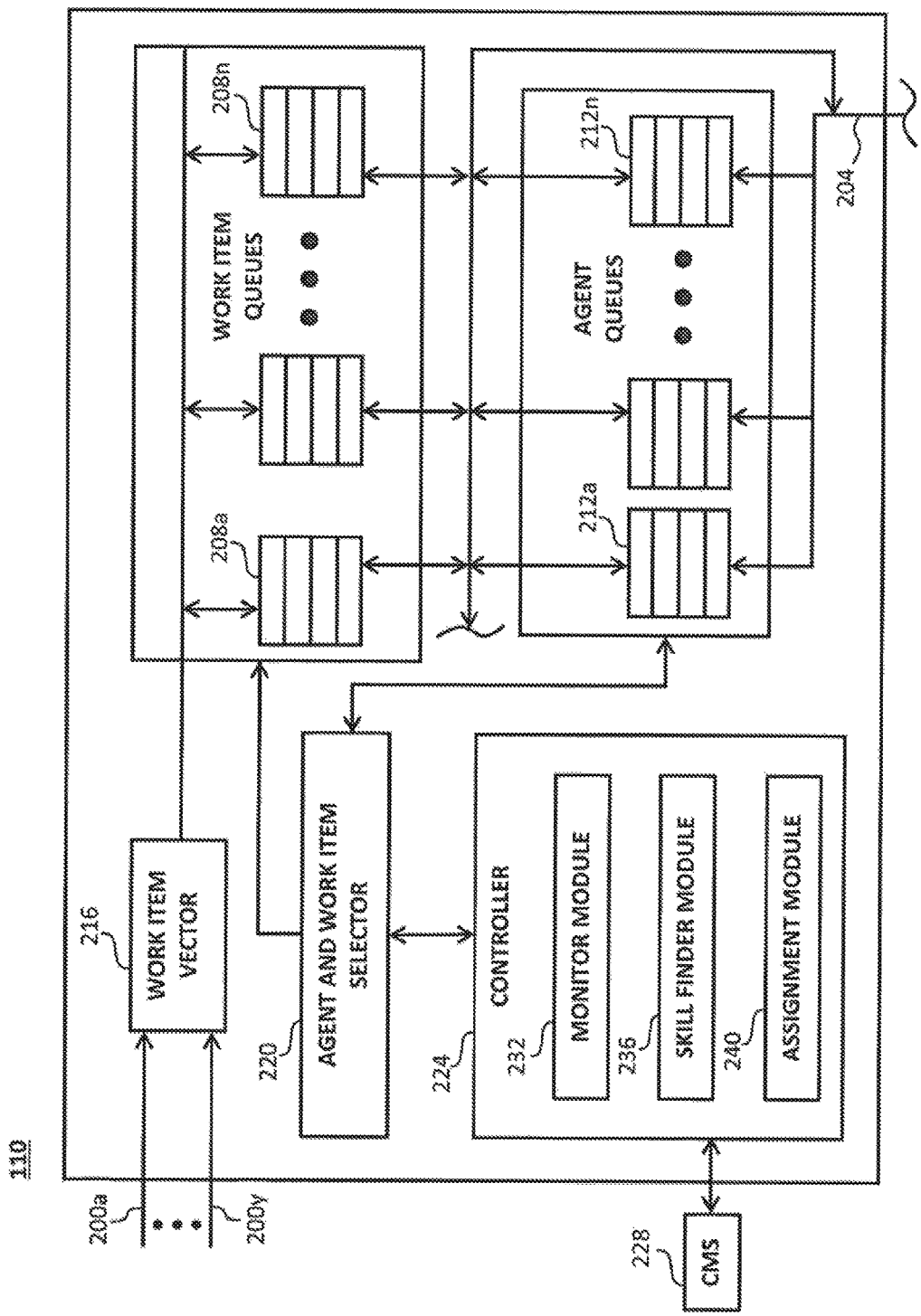
FIG. 3 illustrates a contact center server in accordance with principles of the present disclosure.

Referring to FIG. 3, one possible configuration of the central server 110 of a contact center 100 is depicted. The server 110 is in communications with a plurality of customer communications lines 200a-y (which may be one or more trunks, phone lines, etc.) and an agent communications line 204 (which may be a voice-and-data transmission line such as LAN 142 and/or a circuit switched voice line). The server 110 may include Avaya Inc.'s Operational Analyst™ (OA) with On-Line Analytical Processing (OLAP) technology or a Call Management System (CMS) 228 that gathers contact records and contact-center statistics for use in generating contact-center reports. The OA and the CMS will hereinafter be referred to jointly as CMS 228.

As may be seen in FIG. 3, included among the data stored in the server 110 is a set of work item queues 208a-n and a separate set of agent queues 212a-n. Each work item queue 208a-n corresponds to a different set of agent skills, as does each agent queue 212a-n. Conventionally, work items are prioritized and are either enqueued in individual ones of the work item queues 208a-n in their order of priority or in different ones of a plurality of work item queues 208a-n that correspond to a different priority. Likewise, each agent's skills are prioritized according to his or her level of expertise in that skill, and agents are either enqueued in individual ones of agent queues 212a-n in their order of expertise level or in different ones of a plurality of agent queues 212a-n that correspond to a skill and each one of which corresponds to a different expertise level.

Included among the control programs in the server 110 is a work item vector 216. Contacts incoming to the contact center are assigned by the work item vector 216 to different work item queues 208a-n based on a number of predetermined criteria, including customer identity, customer needs, contact center needs, current contact center queue lengths, customer value, and the agent skill that is required for the proper handling of the contact. Agents who are available for handling work items are assigned to agent queues 212a-n based on the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

In one configuration, the contact center may be operated by a contract operator, and each of the work item queues 208a-n, and possibly each of the agent queues 212a-n, corresponds to a different client. Each client may have a separate service level agreement or other type of performance measurement agreement with the contract operator regarding performance expectations, goals, requirements or specifications for the client's respective queue(s). The service level agreement may set forth penalties, such as financial penalties, for failing to comply with the service level agreement's requirements.

The contact center server 110 may be notified via the LAN 142 of an incoming work item by the communications component (e.g., the switch 130, fax server, e-mail server, web server, and/or other server) receiving the incoming work item. The incoming work item is held by the receiving telecommunications component until the server 110 forwards instructions to the component to forward or route the contact to a specific contact center resource, such as the IVR 122, one or more of the other servers such as a voice mail server 118, and/or a first or second agent communications device 134, 138 associated with a selected agent.

The server 110 distributes and connects these work items to first or second agent communications devices 134, 138 of available agents based on the predetermined criteria noted above. When the server 110 forwards a voice contact (or first work item) to an agent, the server 110 also forwards customer-related information from the database(s) 114 to the agent's computer work station for viewing (such as by a pop-up display) to permit the agent to better serve the customer. Depending on the contact center configuration, the server 110 may forward a list of work items to an available agent to preview before forwarding the work item itself and the data associated therewith to the agent. The agents process the work items or contacts sent to them by the server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

According to an embodiment of the present disclosure, also included among the programs executing on the server 110 are an agent and work item selector 220 and a controller 224, as shown in FIG. 3. The selector 220 and the controller 224 are stored either in the main memory or in a peripheral memory (e.g., disk, CD ROM, etc.) or some other computer-readable medium of the contact center 100. The selector 220 and the controller 224 collectively effect an assignment between available work items (or contacts) and available agents in a way that tends to maximize contact center efficiency for the current contact center state. The selector 220 uses predefined criteria in selecting an appropriate agent to service the work item. The controller 224 assists the work item vector 216 in routing the contacts to the appropriate work item queue(s) 208a-n and the selector 220 in routing a contact to a most desirable agent in the agent queue(s) 212a-n. The controller 224, in particular, obtains, for each of a plurality of contact center goals or objectives, status information, or information respecting whether or not a corresponding goal (for example, the service level agreement) is being met or unmet and/or a level to which the corresponding goal is being met or unmet.

Agent and customer profiles are typically maintained and updated by a profile generator (not shown). Upon the completion of handling a work item, the generator may collect selected metrics for the work item. These metrics include the skill involved in servicing the work item, the identifier of the servicing agent, the contact duration, the transaction or contact type (e.g., catalog sale, information request, complaint, etc.), the time-of-day, the result (e.g., the type of sale, the number of units sold, revenue generated, service ticket closure or escalation, the information provided, etc.), a self-rating of the servicing agent respecting the agent's proficiency in handling the work item, the rating of the customer of the agent's proficiency in handling the work item, the rating of another party, such as the agent's supervisor or another observer, of how the work item was serviced, whether the agent requested assistance, and whether the agent's training was completed, and stores the information in the database(s) 114, such as CMS 228. The metrics over a selected period of time are typically stored under each agent's profile and may include metrics associated with a plurality of work items serviced by the agent for each agent skill. Each agent's profile may also contain his or her skills and/or level(s) of skill expertise. Each customer profile includes metrics associated with a plurality of contacts by the customer.

The controller 224 has access to various performance measures of each of the agent resources and the contact handling history of the resources in the system. The controller 224 is also configured to use various systems, known in the art, to assess the performance of individual agent resources in processing work items. The controller 224 is further configured to find an area of competency for each of the agent resources based on their performance measures and contact handling history. The controller 224 is further configured to utilize such findings in maximizing contact center efficiency.

Embodiments of the present disclosure generally relate to a system and method to save knowledge by a preferred agent about a particular caller or scenario. Later, if the particular caller or scenario recurs, embodiments may recognize that the preferred agent exists and, if the preferred agent is not currently available and will not be available within a reasonable timeframe, embodiments may supply the knowledge to a second agent in order to address the particular caller or scenario.

The existing paradigm in trying to preserve continuity in customer-agent interactions is first to await the arrival of a customer contact (representing either a new customer or a returning customer), and then to attempt to match a preferred agent to the customer contact. In contrast, embodiments in accordance with the present disclosure may attempt to preserve continuity in customer-agent interactions by creating a new paradigm. The new paradigm is a reversal of the existing paradigm, i.e., an agent-driven paradigm. The agent-driven paradigm may be facilitated by access to a context store, which may store a record of previous contacts handled by the contact center, including identity of the callers, the subject matter or reason for calling, what agents handled the callers, and information about the callers gathered from external sources. The context store may also offer numerous integration, interaction and notification features.

In the agent-driven paradigm, agents may have an interest in tracking certain predetermined domains (e.g., users, products, subject matter, or scenarios, etc.) that the agent may be familiar with and about whom the agent may have beneficial extra knowledge. These are examples of agent-specific credentials, and in general will change from one call to another call. For example, the agent may have had previous interactions with this customer or similar customers, this subject matter or similar subject matter, etc. The agent may configure the contact center such that contacts that fall within the predetermined domain preferentially would be routed to the agent. If the agent is not available, or not expected to be available within a predetermined waiting time tolerance, the contact would be routed to a qualified alternate agent. The predetermined waiting time tolerance may be determined by factors such as how strong are the agent's agent-specific credentials for handling this call, the availability of qualified alternate agents, the customer's estimated wait tolerance before hanging up, commercial importance of the customer, and so forth.

In operation, when a customer initiates an interaction with a contact center, a data record about the interaction is recorded in a context store. The data record may include one or more of several fields such as name, customer profile, product, reason for calling, a record of the customer's path to the contact center (e.g. via interactive voice response (IVR) or via tracked website usage), and so forth. The writing of the data record triggers a notification, which will be received by any agent who has registered an interest that matches a field in the data record, e.g., customer name. On receipt of this notification, an "unavailable but knowledgeable" agent may choose to update the data record with additional information that could be useful when handling the customer. When another agent receives this customer contact, the data record containing all this information may be communicated to the other agent (e.g., displayed through a screen pop functionality).

In other embodiments, an agent who has developed subject matter expertise, e.g., on a temporarily-trending subject matter, may make directly available to other agents information regarding how to handle or resolve the subject matter (e.g., as an alert), such that the information is more readily available to other agents, as compared to other methods such as having to search a database, such as a knowledge base. In such embodiments, one agent is proactively attempting to help other agents who may be confronted with similar problems or circumstances. The system is being trained from the agent's perspective, rather than from data or other than customer-driven actions.

Referring again to FIG. 1, system 110 may be used to practice embodiments described herein. Users of a client running on one or more communication terminals (e.g., 134-1-134-N, or 138-1-138-N) may be communicatively connected via network 142 to server 110. Server 110 may operate as a context store 127 or operate to access data for the context store 127 stored in enterprise database(s) 114.

Figure 4:
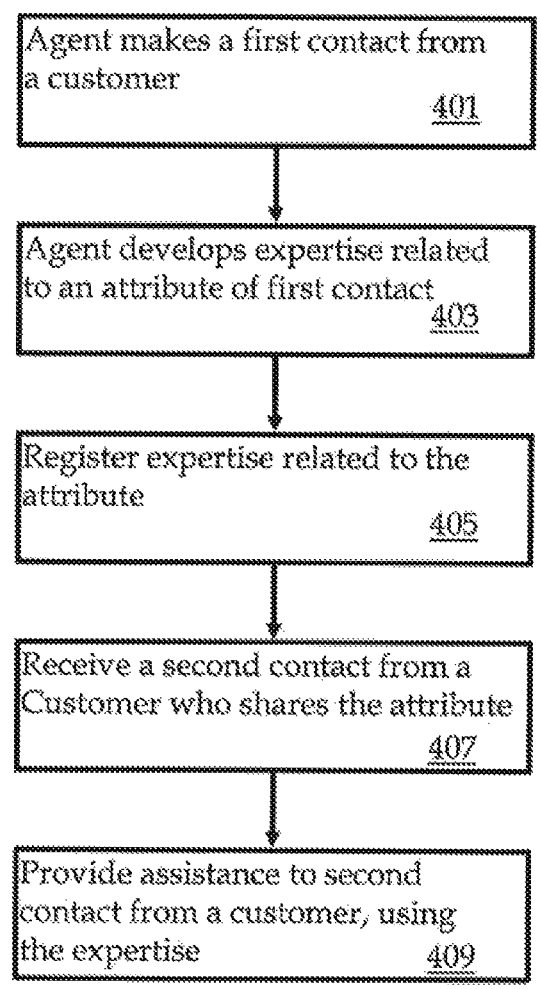
FIGS. 4 and 5 are flowcharts of exemplary methods for performing computer implemented methods at an enterprise in accordance with the principles of the present disclosure.

FIG. 4 illustrates a process 400 in accordance with an embodiment of the present disclosure. Process 400 begins at step 401, at which an agent may make a first contact with a customer of (i.e., a caller to) a contact center, such as contact center 100.

Next, process 400 transitions to step 403, at which the agent develops an expertise related to an attribute of the first customer or the contact made by the first customer. For example, users, products, subject matter, or scenarios, etc. The contact center may assist with developing this expertise, by providing relevant information from a context store.

Next, process 400 transitions to step 405, at which the agent registers expertise related to the attribute. For example, the agent may register that future contacts with a similar attribute should be routed to the agent. The information may be registered in the context store. Alternatively, the agent may publish information related to the attribute or related to a solution to a problem implicating the similar attribute. The published information may be made available to, e.g., other agents.

Next, process 400 transitions to step 407, at which a second contact may be received from a customer, the second contact sharing the attribute from the first contact. The customer in step 407 may be either the same or may be different than the customer in step 401.

Next, process 400 transitions to step 409, at which assistance is provided for the second contact, based upon the expertise. For example, the second contact may be routed to the same agent because of the expertise. In another example, the second contact may be routed to a second agent who has access to the expertise developed by the first agent.

Figure 5:
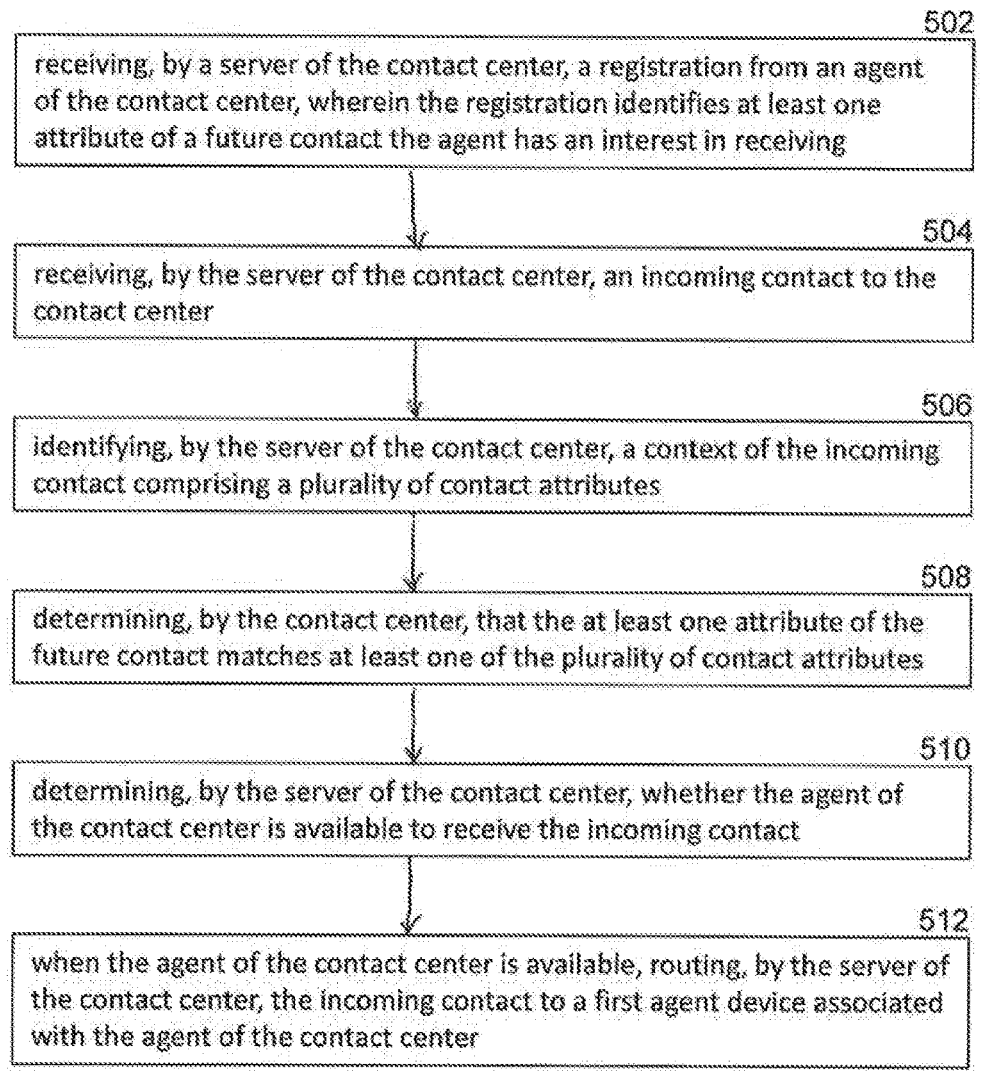

Turning now to FIG. 5, a flowchart is provided for a computer-implemented method for routing contacts in a contact center. As mentioned herein, the method of FIG. 5 can also be implemented using a computer with a memory device storing executable instructions and a processor in communication with the memory device that performs the method steps by executing the executable instructions.

The first step of the flowchart of FIG. 5 is step 502 which recites receiving, by a server of the contact center, a registration from an agent of the contact center, wherein the registration identifies at least one attribute, and typically more than one, of a future contact the agent has an interest in receiving. As discussed earlier, there are areas of interest in which an agent may have developed an expertise or skill. The agent can register with, or identify for, the contact server those attributes of contacts which are related or associated with the areas in which the agent is skilled or has expertise. The database 114, for example, of the contact center 100 may store these registered attributes in a way that associates an agent with those attributes the agent registered.

Afterwards, in step 504, the contact center operates by receiving, by the server of the contact center, an incoming contact to the contact center and then, in step 506, identifying, by the server of the contact center, a context of the incoming contact comprising a plurality of contact attributes. Thus, when an incoming contact is received, the contact center server can retrieve attributes about this contact from the context store. Those attributes can be current attributes for this particular contact or historical attributes related to, or associated with, this particular contact.

Once the attributes of the incoming contact are identified, the flowchart continues, in step 508, by determining, by the contact center, that the at least one attribute of the future contact matches at least one of the plurality of contact attributes and, in step 510, by determining, by the server of the contact center, whether the agent of the contact center is available to receive the incoming contact. In other words, the attributes of the incoming contact can be compared to the attributes that one or more agents previously registered as being of interest to them. The agent that registered the matching attribute can then be identified from the database of registered attributes so that a determination can be made as to whether the agent is currently available to handle the incoming contact or is presently assigned to a different contact.

When the agent of the contact center is available, the flowchart concludes in step 512 by routing, by the server of the contact center, the incoming contact to a first agent device associated with the agent of the contact center. The routing of contacts to agent devices is performed as explained earlier with respect to FIGS. 1-3.

However, when the agent of the contact center is unavailable, the incoming contact can be routed to a second agent device associated with an alternative agent of the contact center that is available. The alternative agent may not be as skilled or have the same level of expertise as the original agent but still may be more knowledgeable than many other agents of the contact center regarding the subject matter of the incoming contact.

To assist the alternative agent, the original agent may provide or identify, beforehand, resources or knowledge helpful in resolving the incoming contact. These resources, or pointers to the resources, can be stored, for example, in the database where the agents registered their attribute interests. When the contact is routed to the alternative agent, these resources or the identification of the resources can be forwarded to a device associated with the alternative agent. Thus the flowchart of FIG. 5 can also include the steps of receiving, by the server of the contact center from the agent of the contact center, information related to resolving the incoming contact; and forwarding, by the server of the contact center, the received information to the second agent device. The helpful resources and information can also be stored in the context store and, in that case, the flowchart of FIG. 5 can include the additional steps of retrieving, by the server of the contact center from a context store, information related to resolving the incoming contact; and forwarding, by the server of the contact center, the retrieved information to the second agent device.

The at least one attribute registered by the agent can comprise an identity of a user associated with the incoming contact; a demographic attribute of a user associated with the incoming contact; or a subject matter of the incoming contact.

Furthermore, when the agent of the contact center is unavailable, the system can predict a waiting time until the agent of the contact center will be available. One of ordinary skill will recognize that a contact center provides a number of ways to estimate when an agent may become available. The duration the agent has been handling a current contact, the complexity of the current contact, the identity of the current contact, and a variety of other attributes allow the contact center to estimate when an agent will become available. When the predicted wait time is more than a predetermined time tolerance, the server of the contact center routes the incoming contact to a second agent device associated with an alternative agent of the contact center, but when the predicted wait time is less than or equal to the predetermined time tolerance, the server of the contact center routes the incoming contact to a queue associated with the agent of the contact center. The predetermined time tolerance may vary depending on characteristics of the incoming contact, the agent, or both. For example, a contact that is potentially of more-than-average commercial importance to the contact center may be handled to minimize any waiting period. However, in instances where the agent's level of expertise or skill is far above other available agents, then a longer predetermined time tolerance may be utilized so that this very-skilled agent has a higher chance of handling the contact.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

Figure 6:
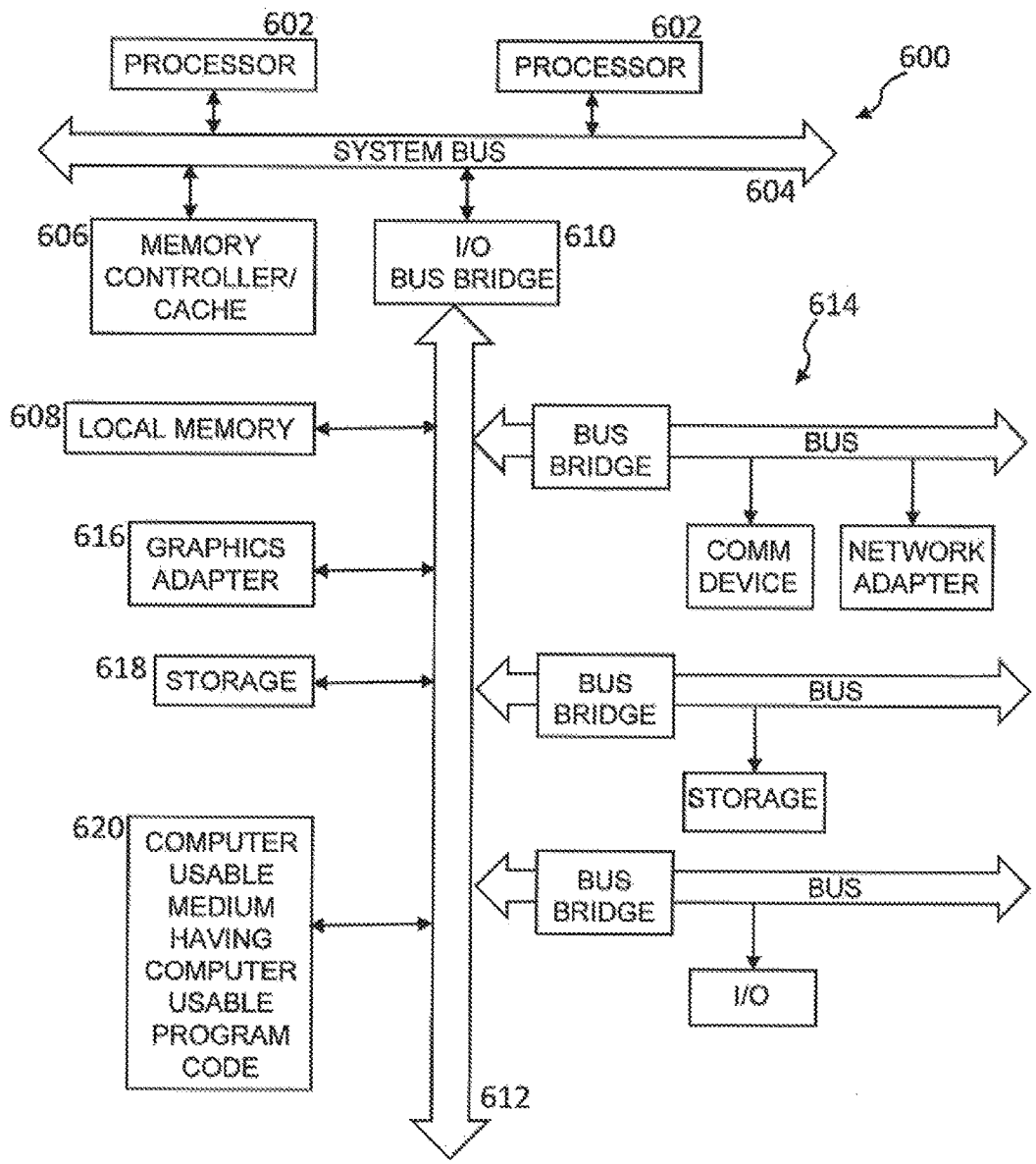
FIG. 6 illustrates an example computer platform in accordance with the principles of the present disclosure.

Referring to FIG. 6, a block diagram of a data processing system is depicted in accordance with the present disclosure. A data processing system 600, such as may be utilized to implement the computers or aspects thereof, e.g., as set out in greater detail in FIG. 1-FIG. 5, may comprise a symmetric multiprocessor (SMP) system or other configuration including a plurality of processors 602 connected to system bus 604. Alternatively, a single processor 602 may be employed. Also connected to system bus 604 is memory controller/cache 606, which provides an interface to local memory 608. An I/O bridge 610 is connected to the system bus 404 and provides an interface to an I/O bus 612. The I/O bus may be utilized to support one or more busses and corresponding devices 614, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 616, storage 618 and a computer usable storage medium 620 having computer usable program code embodied thereon. The computer usable program code may be executed to execute any aspect of the present disclosure, for example, to implement aspect of any of the methods, computer program products and/or system components illustrated in FIG. 1-FIG. 5.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A method of routing contacts in a contact center, comprising:
   receiving, by a server of the contact center, a registration from an agent of the contact center, wherein the registration identifies at least one attribute of a future contact the agent has an interest in receiving;
   receiving, by the server of the contact center, an incoming contact to the contact center;
   identifying, by the server of the contact center, a context of the incoming contact comprising a plurality of contact attributes;
   determining, by the server of the contact center, that the at least one attribute of the future contact matches at least one of the plurality of contact attributes;
   determining, by the server of the contact center, whether the agent of the contact center is available to receive the incoming contact;
   when the agent of the contact center is available, routing, by the server of the contact center, the incoming contact to a first agent device associated with the agent of the contact center; and
   when the agent of the contact center is unavailable:
      routing, by the server of the contact center, the incoming contact to a second agent device associated with an alternative agent of the contact center;
      receiving, by the server of the contact center from the agent of the contact center, information related to resolving the incoming contact; and
      forwarding, by the server of the contact center, the received information to the second agent device.

2. The method of claim 1, comprising:
   retrieving, by the server of the contact center from a context store, information related to resolving the incoming contact; and
   forwarding, by the server of the contact center, the retrieved information to the second agent device.

3. The method of claim 1, wherein the at least one attribute comprises an identity of a user associated with the incoming contact.

4. The method of claim 1, wherein the at least one attribute comprises a demographic attribute of a user associated with the incoming contact.

5. The method of claim 1, wherein the at least one attribute comprises a subject matter of the incoming contact.

6. The method of claim 1, wherein:
   when the agent of the contact center is unavailable, predicting, by the server of the contact center, a waiting time until the agent of the contact center will be available;
   when the predicted wait time is more than a predetermined time tolerance, routing, by the server of the contact center, the incoming contact to a second agent device associated with an alternative agent of the contact center;
   when the predicted wait time is less than or equal to the predetermined time tolerance, routing, by the server of the contact center, the incoming contact to a queue associated with the agent of the contact center.

7. The method of claim 6, wherein the predetermined time tolerance varies based on a commercial importance of a user associated with the incoming contact.

8. The method of claim 1, wherein the predetermined time tolerance varies based on an extent of expertise the agent of the contact center has related to a subject matter of the incoming contact.

9. A system for routing contacts in a contact center, comprising:
   a memory device storing executable instructions; and
   a processor in communication with the memory device, wherein the processor, when executing the executable instructions:
   receives a registration from an agent of the contact center, wherein the registration identifies at least one attribute of a future contact the agent has an interest in receiving;
   receives an incoming contact to the contact center;
   identifies a context of the incoming contact comprising a plurality of contact attributes;
   determines that the at least one attribute of the future contact matches at least one of the plurality of contact attributes;
   determines whether the agent of the contact center is available to receive the incoming contact;
   when the agent of the contact center is available, routes the incoming contact to a first agent device associated with the agent of the contact center; and
   when the agent of the contact center is unavailable:
      routes the incoming contact to a second agent device associated with an alternative agent of the contact center;
      receives from the agent of the contact center, information related to resolving the incoming contact; and
      forwards the received information to the second agent device.

10. The system of claim 9, wherein the processor when executing the executable instructions:
    retrieves from a context store, information related to resolving the incoming contact; and
    forwards the retrieved information to the second agent device.

11. The system of claim 9, wherein the at least one attribute comprises an identity of a user associated with the incoming contact.

12. The system of claim 9, wherein the at least one attribute comprises a demographic attribute of a user associated with the incoming contact.

13. The system of claim 9, wherein the at least one attribute comprises a subject matter of the incoming contact.

14. The system of claim 9, wherein:
    when the agent of the contact center is unavailable, the processor when executing the executable instructions predicts a waiting time until the agent of the contact center will be available;
    when the predicted wait time is more than a predetermined time tolerance, the processor when executing the executable instructions routes the incoming contact to a second agent device associated with an alternative agent of the contact center;
    when the predicted wait time is less than or equal to the predetermined time tolerance, the processor when executing the executable instructions routes the incoming contact to a queue associated with the agent of the contact center.

15. The system of claim 14, wherein the predetermined time tolerance varies based on a commercial importance of a user associated with the incoming contact.

16. The system of claim 9, wherein the predetermined time tolerance varies based on an extent of expertise the agent of the contact center has related to a subject matter of the incoming contact.

* * * * *